United States Patent
Kusaka

(12) 
(10) Patent No.: US 6,229,644 B1
(45) Date of Patent: May 8, 2001

(54) DIFFERENTIAL INTERFERENCE CONTRAST MICROSCOPE AND MICROSCOPIC IMAGE PROCESSING SYSTEM USING THE SAME

(75) Inventor: Kenichi Kusaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/572,666

(22) Filed: May 16, 2000

Related U.S. Application Data

(62) Division of application No. 08/986,095, filed on Dec. 5, 1997, now Pat. No. 6,128,127.

(30) Foreign Application Priority Data

Dec. 5, 1996 (JP) .................................................. 8-325184

(51) Int. Cl.[7] .................................................. G02B 21/00
(52) U.S. Cl. ........................................ 359/371; 359/386
(58) Field of Search .................................... 359/368, 370, 359/371, 385, 386, 389

(56) References Cited

U.S. PATENT DOCUMENTS

| | | | |
|---|---|---|---|
| 3,495,890 | 2/1970 | Pluta | 359/371 |
| 3,558,210 | 1/1971 | Smith | 359/371 |
| 3,876,289 | 4/1975 | DeVeer et al. | 359/683 |
| 4,964,707 | 10/1990 | Hayashi | 359/371 |
| 5,559,630 | 9/1996 | Ho et al. | 359/371 |

FOREIGN PATENT DOCUMENTS

| | | |
|---|---|---|
| 61-181920 | 8/1986 | (JP) . |
| 0735982 | 2/1995 | (JP) . |

OTHER PUBLICATIONS

Optica Atca, 1972, vol. 19, No. 12, 1015–1026, "Differential Interference Contrast Microscope with Continuously Variable Wavefront Shear and Pupilar Compensation", (M. Pluta Central Optical Laboratory, Warsaw, Poland).

*Primary Examiner*—Cassandra Spyrou
*Assistant Examiner*—Mark A. Robinson
(74) *Attorney, Agent, or Firm*—Stevens, Davis, Miller & Mosher, LLP

(57) ABSTRACT

A differential interference contrast microscope including an illuminating light source, a polarizer for converting an illumination light ray into a linearly polarized light, a polarized light separating means for dividing the linearly polarized light ray into two linearly polarized light rays having mutually orthogonal vibrating directions, an illuminating optical system for projecting the two linearly polarized light rays onto an object under inspection, a polarized light combining unit for combining the two linearly polarized light rays on a same optical path via an inspecting optical system, an analyzer for forming a differential interference contrast image on an imaging plane. The polarized light separating unit is constructed such that an amount of wavefront shear between the two linearly polarized light rays on the object can be changed, and the polarized light combining unit is arranged between the object and the analyzer at such a position that the two linearly polarized light rays propagate in parallel with each other and is constructed such that the two linearly polarized light rays can be combined with each other in accordance with the shear amount of wavefront introduced by the polarized light separating unit.

4 Claims, 14 Drawing Sheets

FIG_5
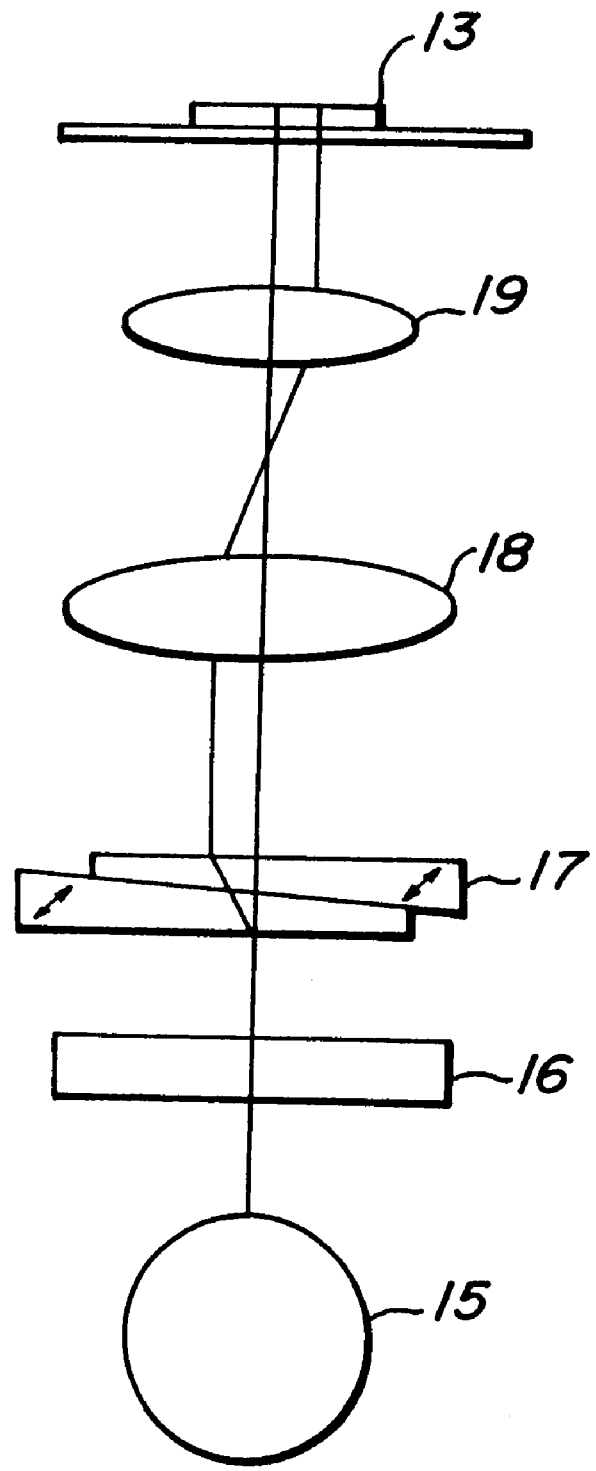

FIG_8

FIG_11

FIG_14
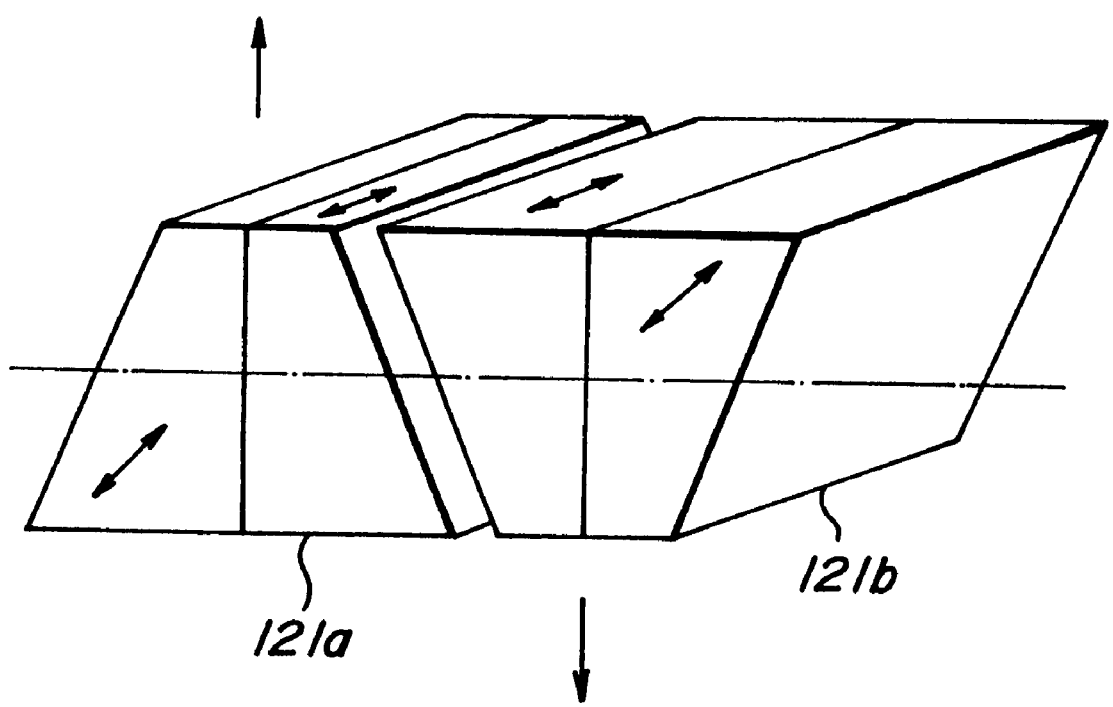

DIFFERENTIAL INTERFERENCE CONTRAST MICROSCOPE AND MICROSCOPIC IMAGE PROCESSING SYSTEM USING THE SAME

This is a division of application Ser. No. 08/986,095, filed Dec. 5, 1997 now U.S. Pat. No. 6,128,127.

BACKGROUND OF THE INVENTION

1. Field of the Invention

The present invention relates to a differential interference contrast microscope for use in investigating transparent biological substances or specimens such as cells and bacteria as well as a fine pattern of projections and depressions formed on a surface of a semiconductor substrate, e.g. a silicon wafer. The present invention also relates to a microscopic image processing system using such a differential interference contrast microscope.

2. Related Art Statement

FIG. 1 shows a known differential interference contrast microscope of transmission type. The microscope comprises, in addition to illumination light source 1, condenser lens 2 and objective lens 3 which are generally provided in a conventional optical microscope, polarizer 5 and Nomarski prism 6 which are arranged in this order between the illumination light source 1 and the condenser lens 2, and Nomarski prism 7 and analyzer 8 which are arranged in this order between the objective lens 3 and an imaging plane 4. In such a differential interference contrast microscope, after a light ray emitted by the light source 1 is converted by the polarizer 5 into a linearly polarized light ray, the light ray is divided by the Nomarski prism 6 into ordinary and extraordinary light rays. Then, these two linearly polarized light rays are projected by the condenser lens 2 onto a specimen or object 9 under inspection. The ordinary and extraordinary light rays transmitted through the specimen 9 are combined via the objective lens 3 on a same light path by means of the Namarski prism 7. Then, the combined light rays are made incident upon the analyzer 8 to form a differential interference contrast image on the imaging plane 4.

Here, an amount of the separation between the ordinary light ray and the extraordinary light ray on the specimen 9 under inspection is called an amount of wavefront shear or a shear amount of wavefront. It has been known that an amount of wavefront shear is an important parameter for defining the contrast of the differential interference contract image and the resolving power of the microscope. For instance, in Japanese Patent Laid-open Publication Kokai Hei 7-35982, there is described that in order to obtain a practical contrast under the inspection with naked eye, it is necessary to increase an amount of wavefront shear to a certain extent. However, when an amount of wavefront shear is increased beyond the resolving power of the objective lens of the microscope, a so-called double image is inspected to decrease the resolution of the image.

Therefore, in known differential interference contrast microscope, in order to investigate various objects, the shear amount of wavefront between the two linearly polarized light rays on an object under inspection is usually determined such that the contrast and the resolution of the image inspected by the naked eye are balanced suitably.

However, there has been proposed to change an amount of wavefront shear in accordance with objects under inspection. For instance, in a microscopic image processing system using the transmission type differential interference contrast microscope, a differential interference contrast image obtained by the microscope is picked-up by an electronic image sensing device and a contrast of the image is enhanced by an image processing method. In such a contrast enhancing method, it is possible to monitor clearly a differential interference contrast image having a too low contrast to be seen by the usual inspection with the naked eye. In order to further increase the resolution of the monitored image, an amount of wavefront shear has to be decreased below a conventional value which has been used for inspecting the differential interference contrast image with the naked eye as described in the above mentioned Japanese Patent Publication Kokai Hei 7-35982.

A reflection type differential interference contrast microscope has been also used to inspect a fine structure such as a gap portion of a magnetic head. Also in this case, it has been known that the differential interference contrast microscopic image can be inspected much more clearly by decreasing an amount of wavefront shear.

As explained above, recently it has been desired to obtain a differential interference contrast image by changing an amount of wavefront shear and differential interference contrast microscopes which can offer different amounts of wavefront shear have been available from almost microscope makers. A similar faculty for changing an amount of wavefront shear has been also required in a microscopic image processing system using a differential interference contrast microscope such as various measuring equipments. For instance, not only the above mentioned microscopic image processing system using the contrast enhancing method, but also a step measuring device for inspecting a step of an object under inspection by utilizing the differential interference contrast, a phase difference measuring device for measuring a phase distribution of a transparent object under inspection by utilizing the differential interference contrast and a position detecting device for detection a position of an alignment mark on a semiconductor wafer have encountered the same problem. In these devices, the measurement and position detection could be performed much more precisely by applying a suitable amount of wavefront shear for objects under inspection.

However, in known differential interference contrast microscopes, the ordinary and extraordinary light rays are obtained by using the Nomarski prism which is made of a birefringent crystal, and therefore it is necessary to prepare a plurality of Nomarski prisms which are designed to provide different wavelength shears. It should be noted that since the Nomarski prism is manufactured by precisely processing the birefringent crystal, it is liable to be rather expensive. Therefore, a cost for preparing a plurality of expensive Nomarski prisms becomes very high. Moreover, even if a plurality of Nomarski prisms are prepared, each of the prisms has their own specific shear amounts of wavefront, an inspection could not be always possible with an optimum amount of wavefront shear.

In "OPTICA ATCA", 1972, vol. 19, no. 12, 1015–1026, M. Pluta has reported a differential interference contrast microscope with a variable amount of wavefront shear. In this known differential interference contrast microscope, first and second sets of ½ wavelength plate and Nomarski prism are provided on the objective lens side and condenser lens side, respectively, and in each of the first and second sets, the ½ wavelength plate and Nomarski prism are arranged rotatable about an optical axis to change an amount of wavefront shear.

However, in this known differential interference contrast microscope, there is a problem that a positional shift of image might occur upon the rotation of the Nomarski prisms when surfaces of the Nomarski prisms are not in parallel with each other. Moreover, this microscope requires four expensive Nomarski prisms instead of two Nomarski prisms in the conventional differential interference contrast microscope, and thus a cost is apparently increased.

SUMMARY OF THE INVENTION

The present invention has for its object to provide a novel and useful differential interference contrast microscope of transmission type and reflection type, in which an amount of wavefront shear can be changed by a simple construction in a less expensive manner.

It is another object of the invention to provide a novel and useful differential interference contrast microscope of reflection type, in which an amount of wavefront shear can be changed by a simple construction in a less expensive manner.

It is still another object of the invention to provide a novel and useful microscopic image processing system using a differential interference contrast microscope with a variable amount of wavefront shear.

According to a first aspect of the invention, a differential interference contrast microscope of transmission type comprises:

an illumination light source means for emitting an illumination light ray;
a first polarizing means for converting the illumination light ray emitted from the illumination light source means into a linearly polarized light ray;
a polarized light separating means for separating the linearly polarized light ray emanating from the first polarizing means into two linearly polarized light rays having mutually orthogonal vibrating directions;
an illuminating optical system including a condenser lens and introducing said two linearly polarized light rays having mutually orthogonal vibrating directions onto an object under inspection;
an inspecting optical system including an objective lens and inspecting the object under inspection;
a polarized light combining means for combining said two linearly polarized light rays transmitted through the object under inspection on a same optical axis; and
a second polarizing means for interfering said two linearly polarized light rays combined on the same optical axis with each other to form an interference image;
wherein said polarized light separating means is constructed to change an amount of wavefront shear of the two linearly polarized light rays on the object under inspection, and said polarized light combining means is arranged between said object under inspection and said second polarizing means at such a position that said two linearly polarized light rays having the mutually orthogonal vibrating directions propagate in parallel with each other and are combined with each other on the same optical axis in accordance with a variable amount of wavefront shear introduced by said polarized light separating means.

In the differential interference contrast microscope of transmission type according to the invention, the polarized light combining means is not formed by a conventional Nomarski prism, and is arranged at such a position that the two linearly polarized light rays having the mutually orthogonal vibrating directions propagate in parallel with each other and are combined with each other on the same optical axis in accordance with a variable amount of wavefront shear introduced by the polarized light separating means. By constructing the polarized light combining means in this manner, it is possible to decrease the number of Nomarski prisms upon compared with the above mentioned known differential interference contrast microscope proposed by M. Pluta.

The polarized light combining means is constructed to change an amount of wavefront shear of the two linearly polarized light rays with mutually orthogonal vibrating directions and is provided at such a position that these two linearly polarized light rays propagate in parallel with each other, said position being different from that of the conventional differential interference contrast microscope. Therefore, according to the invention, the polarized light combining means is arranged at such a position between the object under inspection and the second polarizing means that the two linearly polarized light rays propagate in parallel with each other.

According to a second aspect of the invention, a differential interference contrast microscope of transmission type comprises:

an illumination light source means for emitting an illumination light ray;
a first polarizing means for converting the illumination light ray emitted from the illumination light source means into a linearly polarized light ray;
an illuminating optical system including a condenser lens and illuminating an object under inspection with said linearly polarized light ray;
an inspecting optical system including an objective lens and inspecting the object under inspection;
a second polarizing means for interfering two linearly polarized light rays combined on a same optical axis with each other to form an interference image;
a polarized light separating and combining means for separating the linearly polarized light ray emanating from the first polarizing means into two linearly polarized light rays having mutually orthogonal vibrating directions and combining two linearly polarized light rays propagating in parallel with each other on a same optical axis; and
a reflection means for projecting said linearly polarized light ray emanating from said first polarizing means onto the object under inspection by means of said polarized light separating and combining means and illuminating optical system as said two linearly polarized light rays having mutually orthogonal vibrating directions and propagating in parallel with each other, and impinging the two linearly polarized light rays transmitted through the object under inspection, having mutually orthogonal vibrating directions and propagating in parallel with each other upon said polarized light separating and combining means by means of said imaging optical system.

In this differential interference contrast microscope of transmission type, since the separation of the linearly polarized light ray into the two linearly polarized light rays with mutually orthogonal vibrating directions and the combination of these two linearly polarized light rays are performed by the single polarized light separating and combining means, the construction can be simpler and a cost can be decreased.

According to a third aspect of the invention, a differential interference contrast microscope of reflection type comprises:

an illumination light source means for emitting an illumination light ray;

a first polarizing means for converting the illumination light ray emitted from the illumination light source means into a linearly polarized light ray;

an imaging optical system including an objective lens for irradiating an object under inspection and inspecting the object under inspection;

a reflection member for introducing said linearly polarized light ray emanating from the first polarizing means into said imaging optical system;

a polarized light separating and combining means for separating the linearly polarized light ray emanating from the first polarizing means into two linearly polarized light rays having mutually orthogonal vibrating directions and combining the two linearly polarized light rays reflected by the object under inspection with other on a same optical axis; and a second polarizing means for interfering the two linearly polarized light rays combined on a same optical axis with each other to form an interference image;

wherein said polarized light separating and combining means is constructed such that said linearly polarized light ray emanating from the first polarizing means into the two linearly polarized light rays having mutually orthogonal vibrating directions and propagating in parallel with each other and an amount of wavefront of said two linearly polarized light rays can be changed, and said polarized light separating and combining means is arranged at such a position that said two linearly polarized light rays with mutually orthogonal vibrating directions are made incident upon the object under inspection in parallel with each other.

In this manner, in the differential interference contrast microscope of reflection type according to the invention, an amount of wavefront shear between the two linearly polarized light rays on the object under inspection can be changed by using the single polarized light separating and combining means, and thus the construction becomes simple and less expensive.

According to a fourth aspect of the invention, a microscopic image processing system comprises:

a differential interference contrast microscope, in which an object under inspection is irradiated with two linearly polarized light rays having mutually orthogonal vibrating directions and the two linearly polarized light rays transmitted through or reflected by the object under inspection are combined on a same optical axis to form a differential interference contrast image of the object under inspection on an imaging plane;

an electronic image sensing means for picking-up said differential interference contrast image of the object under inspection to derive an image signal; and an image processing means for performing selectively a contrast enhancement for said image signal supplied from said electronic image sensing means;

wherein an amount of wavefront shear of said two linearly polarized light rays having mutually orthogonal vibrating directions on said object under inspection is changed in accordance with an image processing to be performed by said image processing means.

In the system in which the contrast enhancement is carried out by processing the image signal obtained through the differential interference contrast microscope, it is preferable to adjust an amount of wavefront shear to a value smaller than a value which is conventionally used in the inspection with the naked eye as described in the above mentioned Japanese Patent Publication Kokai Hei 7-35982. However, when a shear amount is decreased, a contrast of the differential interference contrast image might become lower and the alignment of the object under inspection could not be performed easily with the naked eye. In the above mentioned microscopic image processing system according to the invention, an amount of wavefront shear between the two linearly polarized light rays on the object under inspection is changed in accordance with the image processing method to be carried out in the image processing means. Therefore, an amount of wavefront shear can be adjusted to optimum values for the inspection with the naked eye and the contrast enhancement.

According to a fifth aspect of the invention, a microscopic image processing system comprises:

a differential interference contrast microscope, in which an object under inspection is irradiated with two linearly polarized light rays having mutually orthogonal vibrating directions and the two linearly polarized light rays transmitted through or reflected by the object under inspection are combined on a same optical axis to form a differential interference contrast image of the object under inspection on an imaging plane;

an electronic image sensing means for picking-up said differential interference contrast image of the object under inspection to derive an image signal; and an image processing means for processing said image signal supplied from said electronic image sensing means to measure a phase difference or step structure of the object under inspection;

wherein an amount of wavefront shear of said two linearly polarized light rays having mutually orthogonal vibrating directions on said object under inspection is changed.

In the differential interference contrast microscope, when an object under inspection is transparent, a contrast of a differential interference contrast image depends on a phase difference of the object, and when an object is not transparent, a contrast depends on a step structure of the object. Therefore, the differential interference contrast microscope can be applied to the measurement of the phase difference or step structure of the object by using the fringe scan method. In this case, it is preferable to make an amount of wavefront shear as large as possible to increase a contrast, and thus the measurement of phase difference or step structure with a high precision. However, if the wavefront shear is larger than a structure of the object to be inspected, the ordinary and extraordinary light rays could not be made incident upon a desired portion of the object and the measurement could not be carried out.

Therefore, according to the invention, an amount of wavefront shear between the two linearly polarized light rays on the object under inspection can be adjusted to optimum values for the measurement of the phase difference or step structure.

According to a sixth aspect of the invention, a microscopic image processing system comprises:

a differential interference contrast microscope of reflection type, in which an object under inspection is irradiated with two linearly polarized light rays having mutually orthogonal vibrating directions and the two linearly polarized light rays reflected by the object under inspection are combined on a same optical axis to form a differential interference contrast image of the object under inspection on an imaging plane;

an electronic image sensing means for picking-up said differential interference contrast image of the object under inspection to derive an image signal; and an image processing means for processing said image signal supplied from said electronic image sensing means to detect a position of a pattern of depressions and protrusions formed in a surface of the object under inspection;

wherein an amount of wavefront shear of said two linearly polarized light rays having mutually orthogonal vibrating directions on said object under inspection is changed.

By using the above mentioned microscopic image processing system according to the invention, since an amount of wavefront shear between the two linearly polarized light rays can be adjusted, a position of a fine pattern of protrusions and depressions of several nano meters formed in a surface of a semiconductor wafer can be detected precisely. That is to say, an amount of wavefront shear can be increased as large as possible within a range by which the fine structure of protrusions and depressions can be detected.

BRIEF DESCRIPTION OF THE DRAWINGS

FIG. 5 is a schematic view showing an embodiment of the illuminating optical system of the microscope illustrated in FIG. 3;

FIG. 14 is a schematic perspective view illustrating another embodiment of the polarized light separating means according to the invention.

DETAILED EXPLANATION OF THE INVENTION

Figure 3:
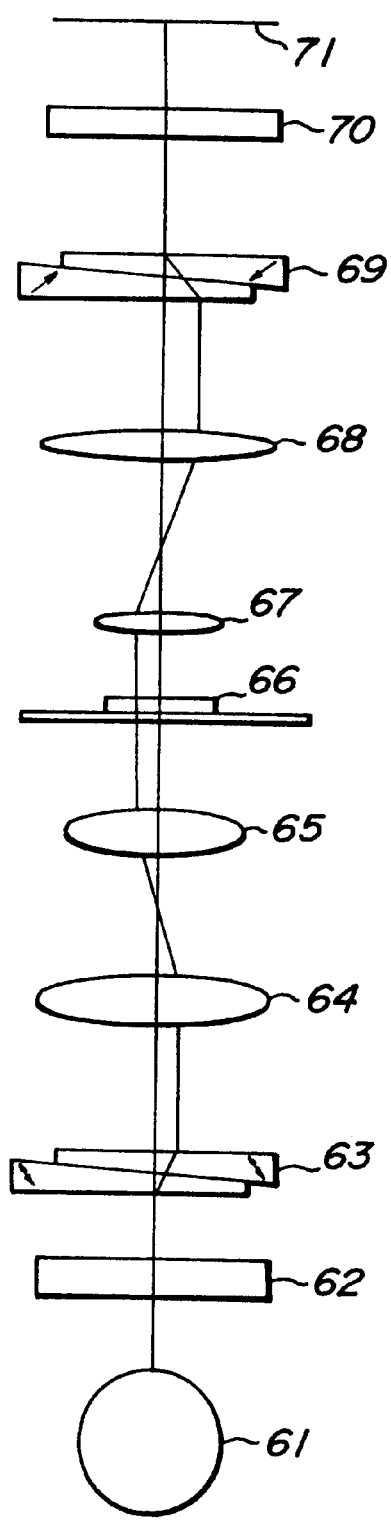
FIG. 3 is a schematic view illustrating a first embodiment of the differential interference contrast microscope of transmission type according to the invention.

FIG. 3 is a schematic view showing a first embodiment of the differential interference contrast microscope of transmission type according to the invention. A light ray emitted from an illuminating light source 61 is converted by a polarizer 62 constituting the first polarizing means into a linearly polarized light ray, and then the linearly polarized light ray is made incident upon a polarized light separating means 63 and is divided into two linearly polarized light rays whose vibrating directions are mutually orthogonal. According to the invention, the polarized light separating means 63 is constructed such that an amount of wavefront shear between said two linearly polarized light rays can be changed continuously. For instance, the polarized light separating means 63 may be constructed by a pair of wedge-shaped crystal plates, at least one of which is movable in a direction perpendicular to an optical axis.

In the present emodiment, the two linearly polarized light rays with orthogonal vibrating directions emanate from the polarized light separating means 63 in parallel with each other. By effecting a relative movement of the two crystal plates, the thickness of the crystal plate or plates is changed continuously so as to change an amount of wavefront shear of the two linearly polarized light rays with mutually orthogonal vibrating directions propagating in parallel with each other.

The two linearly polarized light rays having the mutually orthogonal vibrating directions separated by the polarized light separating means 63 are made incident upon an object 66 under inspection by means of lens groups 64 and 65 constituting the illuminating optical system. The lens groups 64 and 65 are arranged such that a back focal point of the lens group 64 is identical with a front focal point of the lens group 65. Therefore, the two linearly polarized light rays with orthogonal vibrating directions emanating from the polarized light separating means 63 in parallel with each other are made incident upon the object 66 under inspection also in parallel with each other.

The two linearly polarized light rays with mutually orthogonal vibrating directions transmitted through the object 66 under inspection are made incident upon a polarized light combining means 69 by means of a lens group 67 comprising an objective lens and a lens group 68 comprising an imaging lens, these lens groups constituting the imaging optical system. The lens groups 67 and 68 are arranged such that a back focal point of the lens group 67 is identical with a front focal point of the lens group 68, and thus the two linearly polarized light rays having the mutually orthogonal vibrating directions, transmitted through the object 66 under inspection and propagating in parallel with each other are made incident upon the polarized light combining means 69 in parallel with each other.

The polarized light combining means 69 is constructed as illustrated in FIG. 3 and comprises a pair of wedge-shaped crystal plates, at least one of which is movable in a direction perpendicular to an optical axis of the imaging optical system. The thickness of the crystal plate or plates in the optical axis is changed by relatively moving the crystal plates such that the incident two linearly polarized light rays having mutually orthogonal vibrating directions and having the wavefront shear whose amount is determined by the polarized light separating means 63 are combined on the same optical axis. In other words, an acceptable amount of wavefront shear of the polarized light combining means 69 is made equal to that of the polarized light separating means 63.

The two linearly polarized light rays combined by the polarized light combining means 69 on the same optical axis are made incident upon an analyzer 70 constituting the second polarizing means to form an interference image. The thus formed interference image is formed on an imaging plane 71 for the inspection.

In a preferable embodiment of the differential interference contrast microscope of transmission type according to the invention, said inspecting optical system comprises a first lens group including said objective lens and a second lens group including an imaging lens, said first and second lens groups being arranged such that a back focal point of the first lens group is identical with a front focal point of the second lens group, and said polarized light combining means is arranged behind the second lens group.

Figure 4:
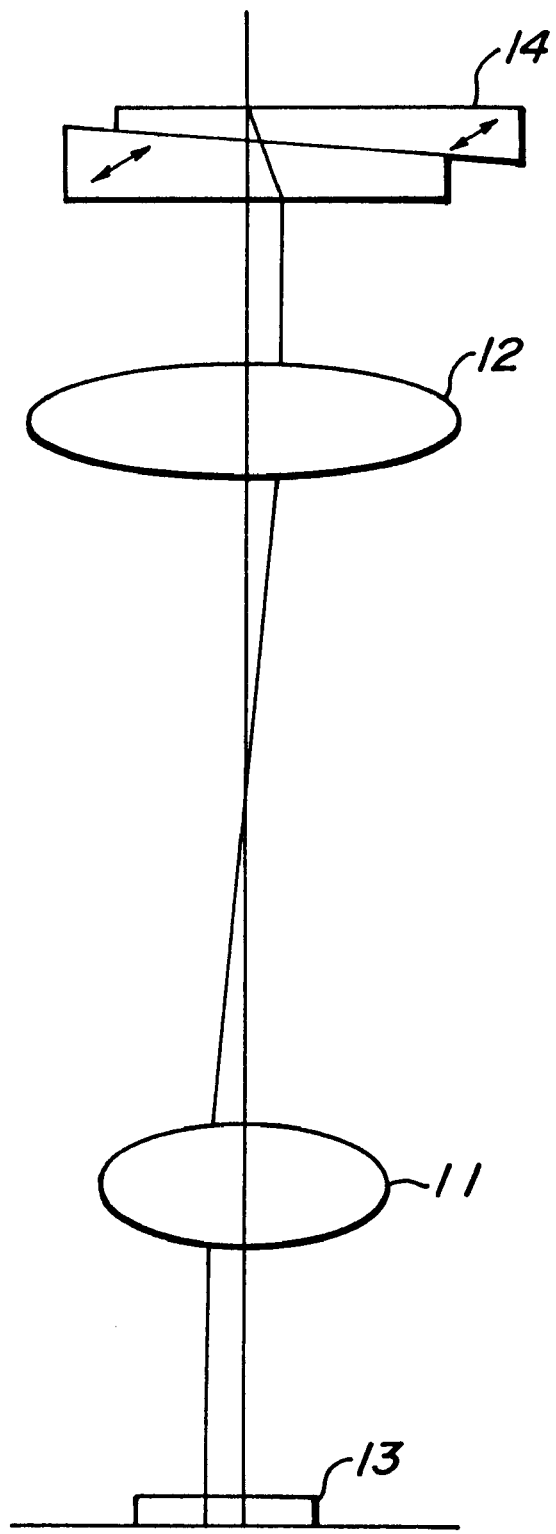
FIG. 4 is a schematic view depicting an embodiment of the imaging optical system of the microscope shown in FIG. 3.

AS shown in FIG. 4, a back focal point of an objective lens 11 is positioned at a front focal point of an imaging lens 12, two linearly polarized light rays having mutually orthogonal vibrating directions are made incident upon a polarized light combining means 14 in parallel with each other and thus are combined on a same optical axis. By such a construction, an unevenness of brightness within a field of view of the differential interference contrast microscope can be decreased.

Figure 1:
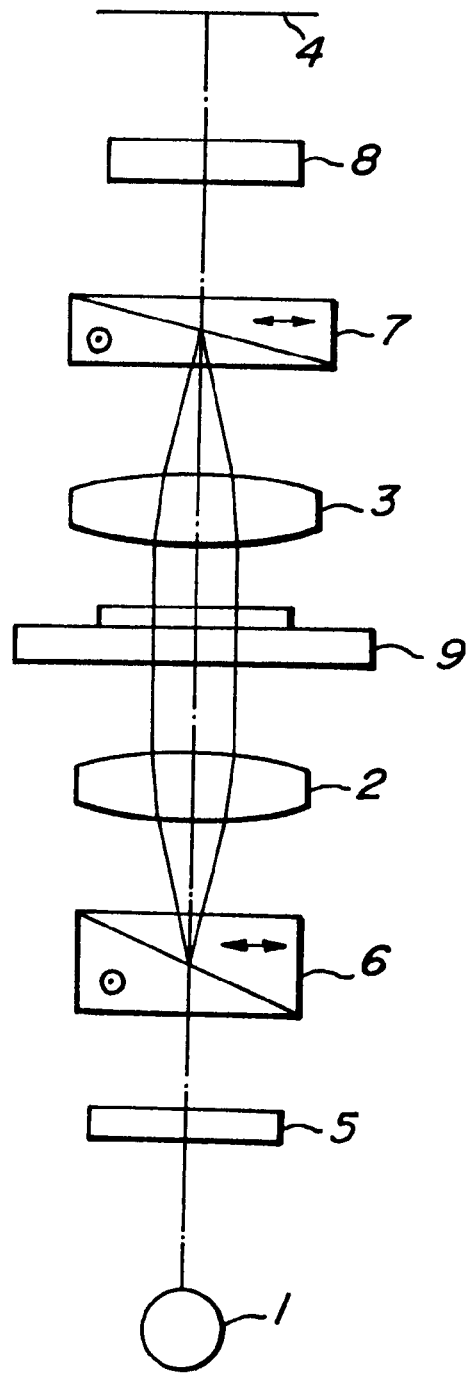
FIG. 1 is a schematic view showing a known differential interference contrast microscope.
Figure 2:
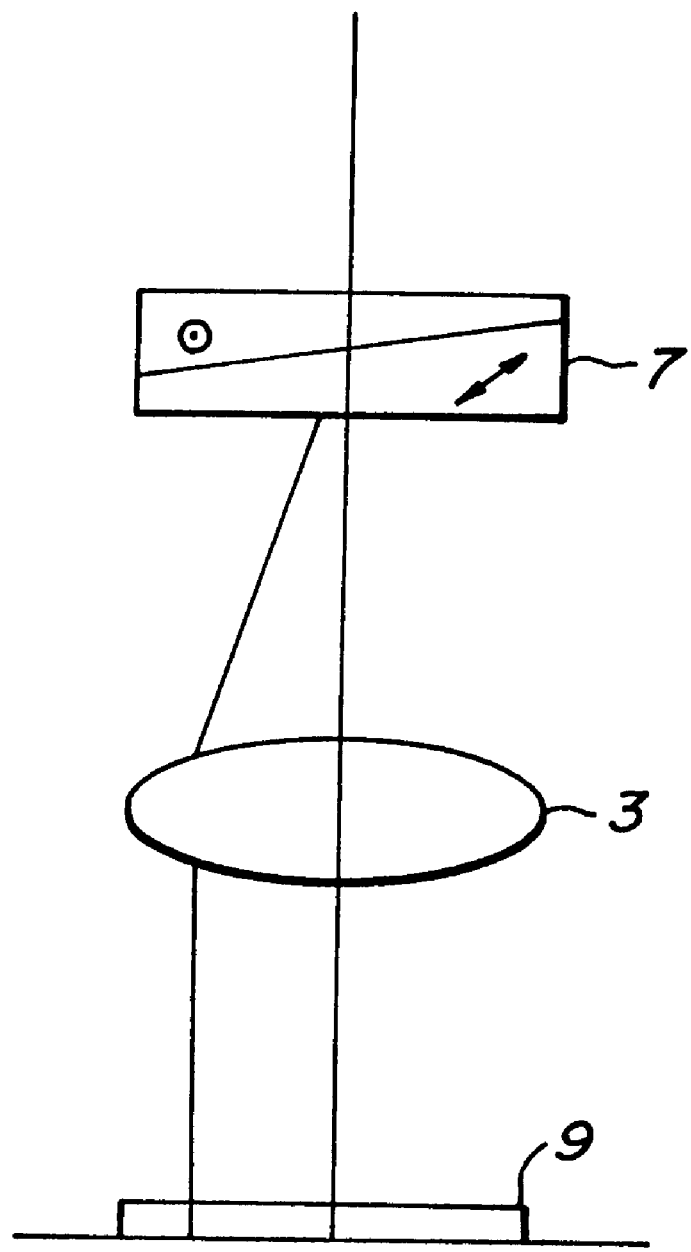
FIG. 2 is an enlarged view of a part of the microscope shown in FIG. 1.

In the known differential interference microscope of transmission type shown in FIG. 1, an incident angle to the Nomarski prism 7 is not constant as shown in FIG. 2 which illustrates a part of the microscope on an enlarged scale. That is to say, a light ray from a central portion of the field of view is made incident upon the Nomarski prism 7 perpendicularly thereto, but a light ray from a peripheral portion of the field of view is obliquely made incident upon the Nomarski prism 7. Therefore, there is introduced a non-uniformity between the ordinary light ray and the extraordinary light ray within the field of view, and thus an unevenness in brightness occurs.

In order to correct the above mentioned unevenness in brightness within the field of view of the differential interference contrast microscope, Japanese Patent Publication Kokai Sho 61-181920 has proposed to arrange a crystal plate which compensates a difference in optical path length between the ordinary light ray and the extraordinary light ray. However, the use of the crystal plate in addition to the Nomarski prism increases a cost of the microscope.

In the preferable embodiment of the differential interference contrast microscope of transmission type according to the invention, as illustrated in FIG. 4, since the back focal point of the objective lens 11 is identical with the front focal point of the imaging lens 12 and the polarized light combining means 14 is arranged behind the imaging lens 12, both the light rays from the central portion and peripheral portion of the field of view are made perpendicularly incident upon the polarized light combining means 14, and thus the unevenness in brightness within the field of view can be decreased by a simple and less expensive structure.

In another preferable embodiment of the differential interference contrast microscope of transmission type according to the invention, said polarized light separating means for separating the incident linearly polarized light ray into the two linearly polarized light rays having mutually orthogonal vibrating directions is arranged at such a position that the two linearly polarized light rays are transmitted through the object under inspection substantially in parallel with each other, and an amount of wavefront shear is changed in cooperation with said polarized light combining means.

In a preferable modification of such an embodiment, said polarized light separating means is constructed such that the two linearly polarized light rays having mutually orthogonal vibrating directions emanate from the polarized light separating means in parallel with each other.

In another preferable embodiment, the polarized light separating means is constructed in a similar manner to the polarized light combining means. In this case, in order to make the two linearly polarized light rays separated by the polarized light separating means incident upon the object under inspection substantially in parallel with each other, it is preferable to construct the illuminating optical system as an afocal system.

In a preferable embodiment of the differential interference contrast microscope of transmission type according to the invention, said illuminating optical system comprises a third lens group and a fourth lens group arranged in this order viewed from the light source means, a back focal point of the third lens group is identical with a front focal point of the fourth lens group, and said polarized light separating means is arranged in front of the third lens group.

As illustrated in FIG. 5, a light ray emitted by an illumination light source 15 is converted by a polarizer constituting the first polarizing means into a linearly polarized light ray, and then the linearly polarized light ray is projected onto the specimen 13 under inspection by means of polarized light separating means 17, third lens group 18 and fourth lens group 19. The polarized light separating means 17 is constructed such that the incident linearly polarized light ray is separated into two linearly polarized light rays having mutually orthogonal vibrating directions and is arranged at such a position that said two linearly polarized light rays transmit the object 13 under inspection substantially in parallel with each other. Then, an amount of wavefront shear can be changed in cooperation with the polarized light combining means not shown in FIG. 5. In the present embodiment, the back focal point of the third lens group 18 is coincided with the front focal point of the fourth lens group 19, and thus the two linearly polarized light rays with mutually orthogonal vibrating directions are made incident upon the object 13 under inspection in parallel with each other. Therefore, it is possible to mitigate the unevenness of brightness within a field of view similar to the embodiment explained above.

In a preferable embodiment of the differential interference contrast microscope according to the invention, the polarized light separating means is constructed such that said two linearly polarized light rays emanate from the polarized light separating means in parallel with each other and is arranged at such a position that these two polarized light rays are made incident upon the object under inspection substantially in parallel with each other. Then, a focal length of the illumination optical system is changed in accordance with a change in a position of the back focal point of an objective lens which is removably inserted into the optical axis. Therefore, the two linearly polarized light rays with mutually orthogonal vibrating directions are made incident upon the polarized light combining means always in parallel with each other.

When the differential interference contrast microscope of transmission type according to the invention is applied to the microscopic image processing system, a plurality of objective lenses having different focal lengths and types are prepared and any desired objective lens is removably inserted into the optical axis. In this case, if a focal length of the illumination optical system is not changed, the two linearly polarized light rays do not propagate in parallel with each other and could not be combined on the same optical axis.

In the above explained preferable embodiment, the focal length of the illumination optical system is changed in accordance with a change in a position of a back focal point of an objective lens. Then, the two linearly polarized light rays can be made incident upon the polarized light combining means always in parallel with each other. In this case, the illumination optical system is preferably formed by an afocal system.

In still another preferable embodiment of the differential interference contrast microscope of transmission type according to the invention, the polarized light separating means comprises a variable power optical system arranged in the illumination optical system, and an amount of wavefront shear is changed in cooperation with the polarized light combining means.

In such an embodiment, an amount of wavefront is changed by changing a power of the illumination optical system. In this case, when the polarized light separating means includes such an optical element that the incident linearly polarized light ray is separated into two linearly polarized light rays which have mutually orthogonal vibrating directions and propagate in parallel with each other and that the two linearly polarized light rays are transmitted through the object under inspection in parallel with each other, said optical system with variable focal length is preferably formed by an afocal optical system to change an amount of wavefront shear on the object under inspection. When the polarized light separating means comprises Wollaston's prism or Nomarski prism, it is preferable to construct the variable power optical system such that an amount of wavefront shear on the object under inspection is change by changing a focal length of the illumination optical system. It should be noted that the variable power may be realized by the zoom system or turret system.

In a preferable embodiment of the differential interference contrast microscope of transmission type according to the invention, a phase difference changing means for changing a phase difference between said two linearly polarized light rays having mutually orthogonal vibrating directions is provided in the optical path between the polarized light separating means and the polarized light combining means.

In the differential interference contrast microscope, the inspection is usually carried out with an optimum contrast by changing a phase difference between the two linearly polarized light rays. In the present invention, at least the polarized light separating means is different from the conventional Nomarski prism, and thus a phase difference between the two linearly polarized light rays is liable to be very large. Therefore, it is advantageous to provide the above mentioned phase difference changing means.

Further, in the embodiment just explained above, it is further preferable to form the illumination light source by a quasi-monochromatic light source.

By using the quasi-monochromatic light source, the phase difference changing means may be constructed such that the phase difference is changed merely within a range from 0 to $2\pi$. Therefore, the phase difference changing means may be formed by a simple element such as the Sénamont compensator. When the illumination light source is formed by a white light source, a variation in the phase difference between the two polarized light rays with mutually orthogonal vibrating directions upon changing an amount of wavefront shear becomes large, and therefore it is difficult to compensate such a large phase difference by means of a single phase compensator. That is to say, the phase difference changing means has to be constructed by a combination of a phase compensator and a plurality of wavelength plates, and the wavelength plates must be changed in accordance with a phase difference. In this manner, the phase difference changing means becomes complicated in construction and could not be handled easily.

In another preferable embodiment of the differential interference microscope of transmission type according to the invention, at least one of the polarized light separating means and polarized light combining means is formed by a pair of wedged-shaped crystal plates, at least one of which is arranged movably in a direction perpendicular to the optical axis.

Figure 6A:
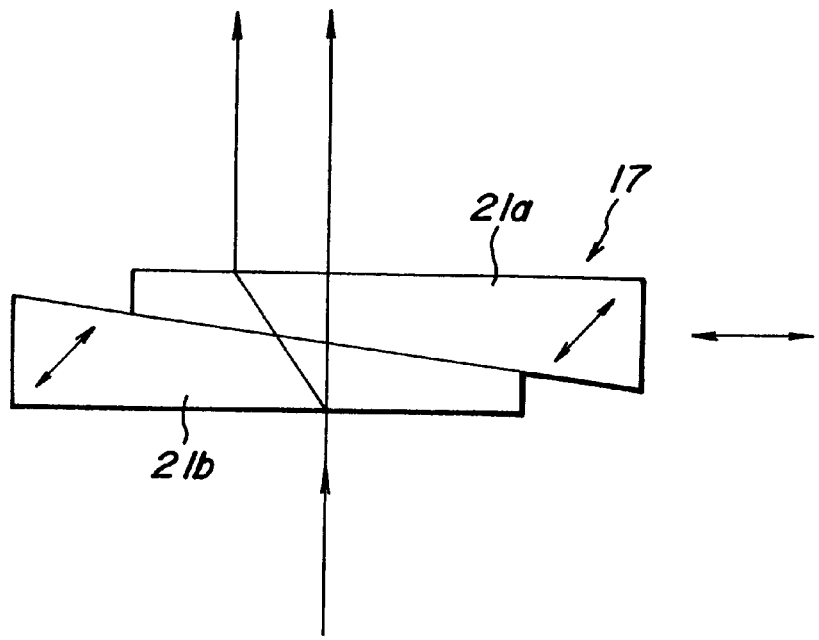
FIGS. 6A and 6B are schematic views showing the polarized light separating means and polarized light combining means, respectively of the microscope of FIG. 3.

As illustrated in FIG. 6A, the polarized light separating means 17 is formed by a pair of wedge-shaped crystal plates 21a and 21b, and the crystal plate 21a is arranged movably in a direction perpendicular to the optical axis as depicted by a double-headed arrow. The incident linearly polarized light ray can be separated into two linearly polarized light rays having mutually orthogonal vibrating directions and propagating in parallel with each other. When the crystal plate 21a is moved to change a thickness of the crystal plate 21a, an amount of wavefront shear between the two linearly polarized light rays can be changed in a continuous manner.

Figure 6B:
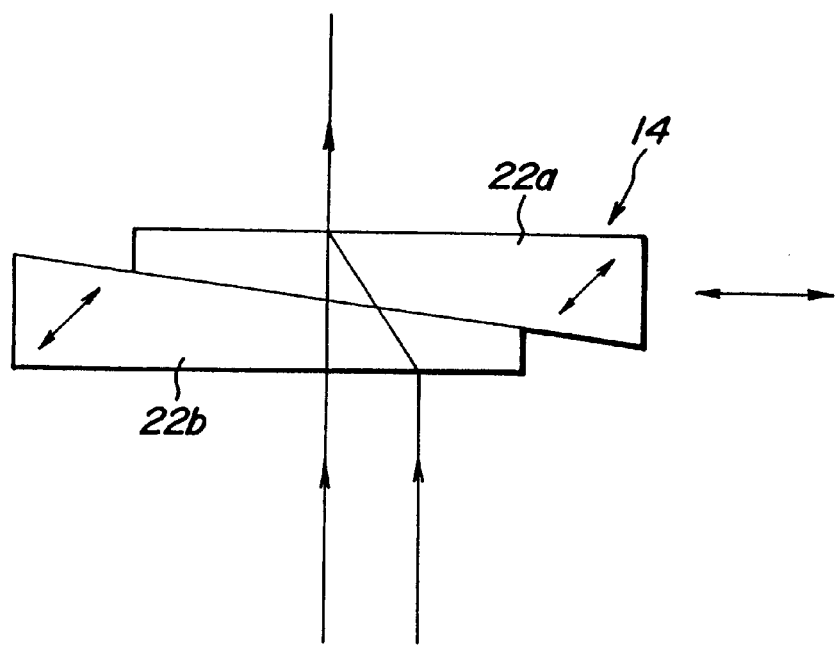

FIG. 6B shows an embodiment of the polarized light combining means 14 comprising a pair of wedge-shaped crystal plates 23a and 23b, the crystal plate 23a being arranged movably in a direction of the optical axis of the inspection optical system. The crystal plate 23a is moved to change its thickness in the direction of the optical axis in accordance with an amount of wavefront shear of the incident two linearly polarized light rays with mutually orthogonal vibrating directions such that the these two linearly polarized light rays are combined on the optical axis.

It is preferable to make the wedge-shaped crystal plates of a quartz having a relatively small birefringence, because such a quartz can be processed relatively easily. According to the invention, the wedged-shaped crystal plate may be also made of a calcite which has a relatively large birefringency or any other birefringent material. In FIGS. 4–6, arrows in the crystal plates denote directions of optic axes of the crystal plates. In another drawings, arrows in crystal plates represent directions of optic axes.

Figure 7:
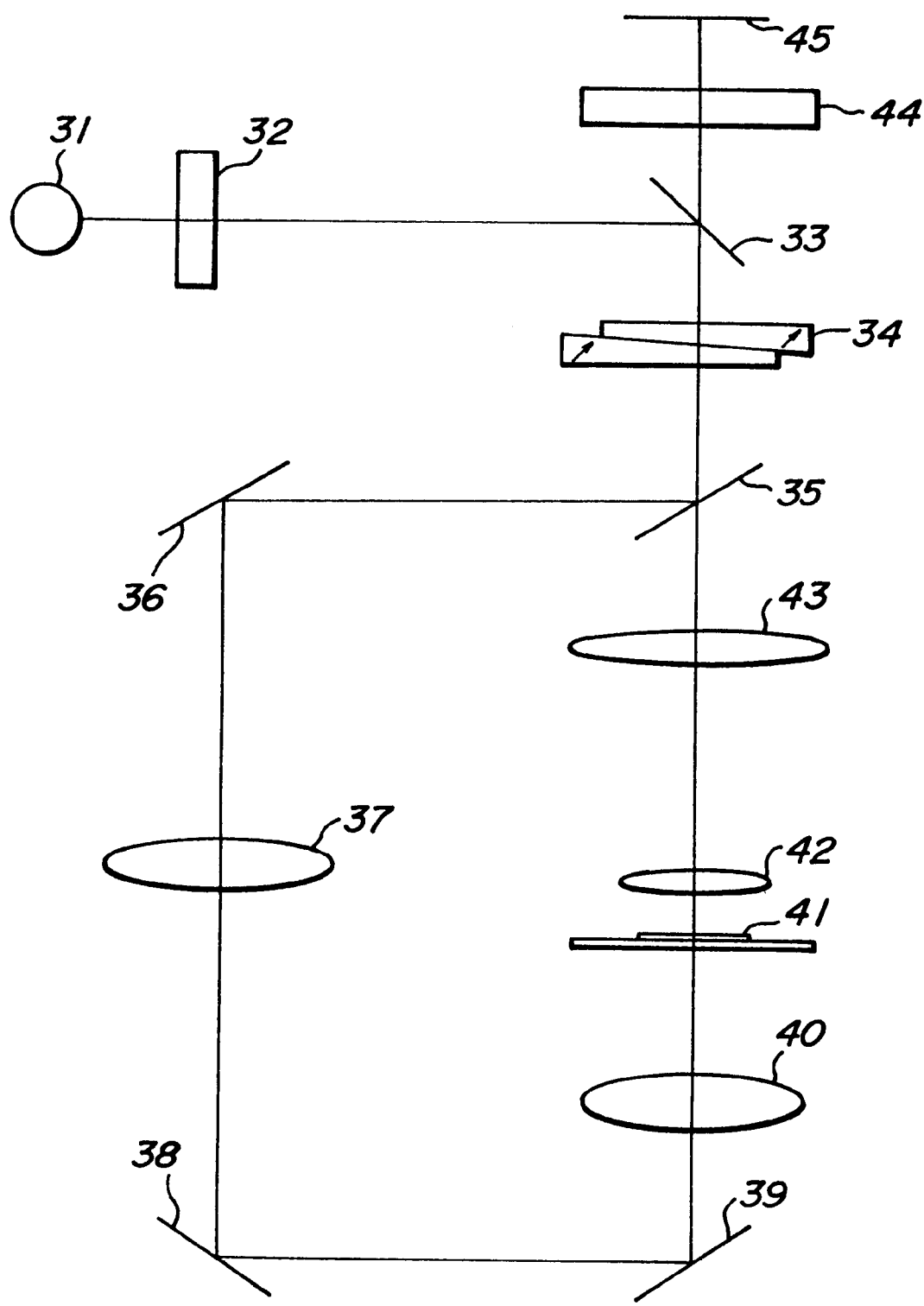
FIG. 7 is a schematic view depicting a second embodiment of the differential interference contrast microscope of transmission type according to the invention.

FIG. 7 is a schematic view showing a second embodiment of the differential interference contrast microscope of transmission type according to the invention. In the present embodiment, an illumination light ray emitted by an illumination light source 31 is converted into a linearly polarized light ray by an analyzer 32 constituting the first polarizing means, and then the thus linearly polarized light ray is reflected by a half mirror 33 and is made incident upon a polarized light separating and combining means 34, in which an amount of wavefront shear can be changed. Then, two linearly polarized light rays having mutually orthogonal vibrating directions emanate from the polarized light separating and combining means 34 in parallel with each other. These linearly polarized light rays are reflected by a half mirror 35, and are made incident upon an object 41 under inspection by means of reflection mirror 36, illuminating lens 37, reflection mirrors 38 and 39 and illuminating lens 40. The two linearly polarized light rays with mutually orthogonal vibrating directions are transmitted through the object 41 under inspection and emanate therefrom in parallel with each other. Then, these two linearly polarized light rays are made incident upon the half mirror 35 by means of objective lens 42 and imaging lens 43 and are transmitted through the half mirror 35. Then, the two linearly polarized light rays with mutually orthogonal vibrating directions are made incident upon the polarized light separating and combining means 34 in parallel with each other and are combined thereby on the same optical axis. The combined two linearly polarized light rays are made incident upon a polarizer 44 constituting the second polarizing means to form an interference image on an imaging plane 45.

In this manner, the separating operation and combining operation are performed by the single means 34, and thus it is no more necessary to effect the adjustment of an amount of wavefront shear in the previous embodiment. In the embodiment shown in FIG. 7, in order to prevent the two linearly polarized light rays emanating from the polarized light separating and combining means 34 from being made incident upon the analyzer 44 by means of the half mirror 35, imaging lens 43, objective lens 42, object 41 under inspection, illumination lens 40, reflection mirrors 39 and 38, illumination lens 37, reflection mirror 36, half mirror 35, polarized light separating and combining means 34 and half mirror 33 in this order, it is desired to provide an optical isolator comprising a combination of, for instance a rotatary crystal and a Faraday element.

Figure 8:
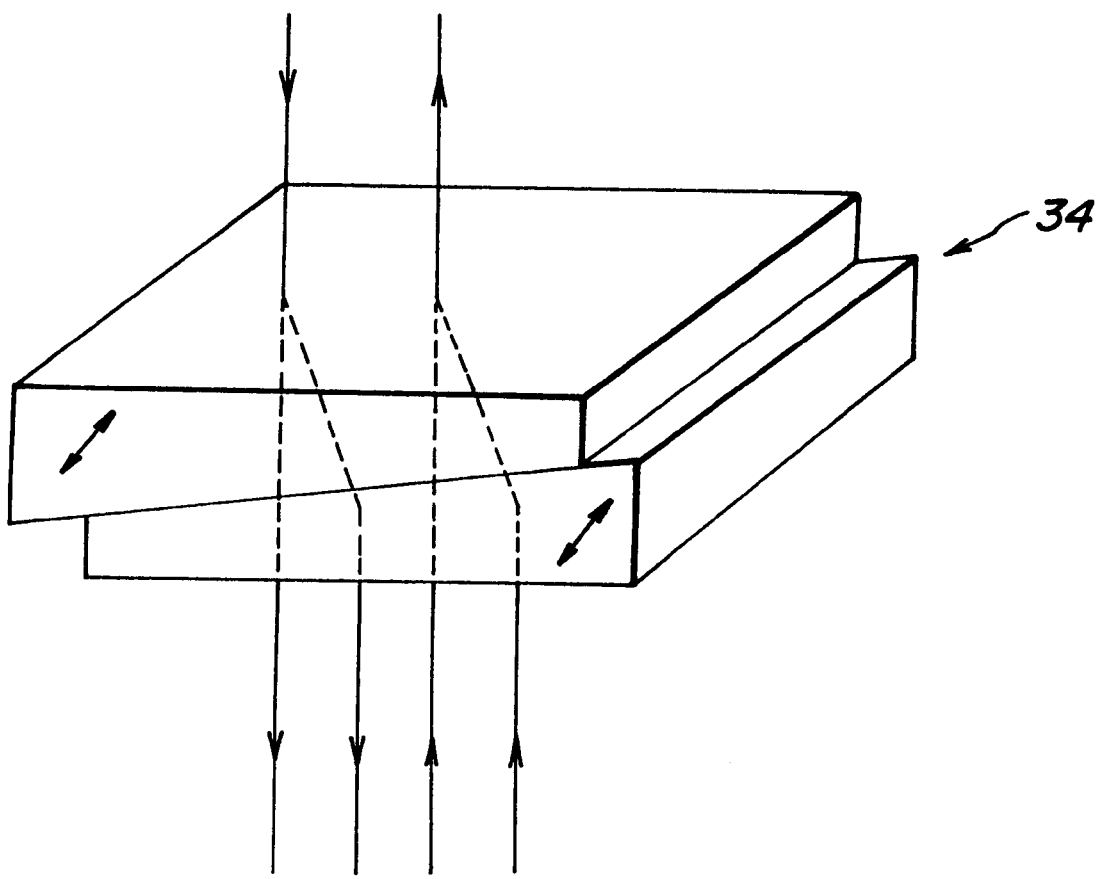
FIG. 8 is a schematic view illustrating the polarized light separating and combining means of the microscope shown in FIG. 7.

In a modification of the second embodiment shown in FIG. 7, the linearly polarized light ray emanating from the polarizer 32 is made incident upon the polarized light separating and combining means 34 at a first surface portion and the two linearly polarized light rays whose vibrating directions are orthogonal to each other are made incident upon the polarized light separating and combining means 34 at a second surface portion which is separated from said first surface portion. That is to say, as depicted in FIG. 8, separate parts of the polarized light separating and combining means 34 are used to separate the polarized light ray and combine the two linearly polarized light rays, respectively. Also in this case, an amount of wavefront shear between the two linearly polarized light rays having mutually orthogonal vibrating directions emanating from the polarized light separating and combining means 34 becomes identical with that of the two linearly polarized light rays impinging upon the same means 34. By using such a polarized light separating and combining means 34, it is possible to separate completely the illuminating optical system and the inspecting optical system, and thus a possible decrease in contrast due to flare light can be avoided.

Figure 9:
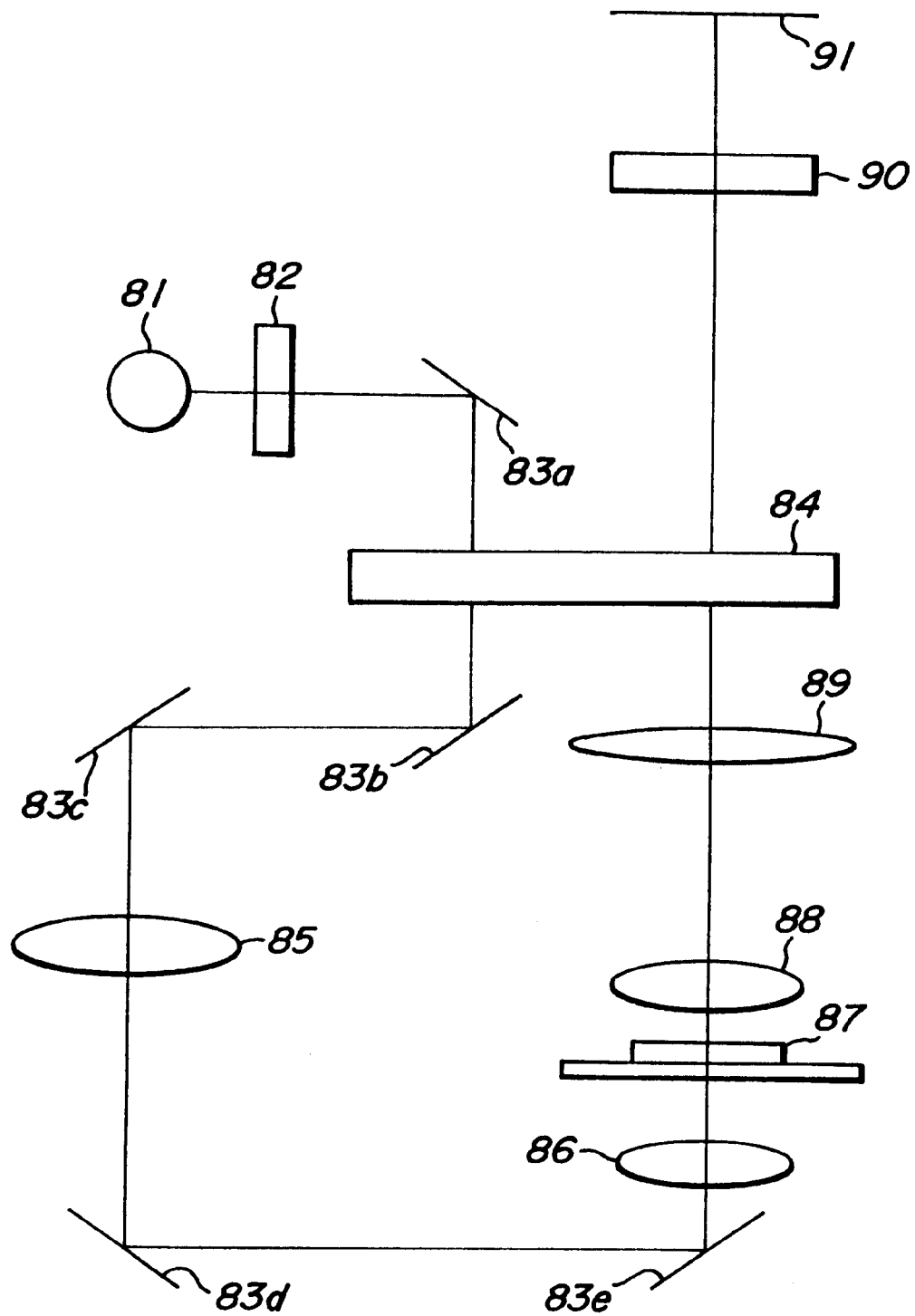
FIG. 9 is schematic view showing a third embodiment of the differential interference contrast microscope of transmission type according to the invention.

FIG. 9 is a schematic view illustrating a third embodiment of the differential interference contrast microscope of transmission type according to the invention, in which the separation and combination of the two linearly polarized light rays are carried out by one and same polarized light separating and combining means. In this embodiment, a light ray emitted by an illumination light source 81 is converted into a linearly polarized light ray by an analyzer 82, and then the linearly polarized light ray is made incident upon a first portion of a polarized light separating and combining means 84 by means of a mirror 83a and is separated into two linearly polarized light rays which have mutually orthogonal vibrating directions and propagate in parallel with each other. The polarized light separating and combining means 84 may be formed by two wedge-shaped crystal plates like as the polarized light separating and combining means 34 shown in FIG. 8. Then, an amount of wavefront shear can be adjusted by moving one of the crystal plates in the direction perpendicular to the optical axis.

The two linearly polarized light rays having mutually orthogonal vibrating directions and propagating in parallel with each other are then made incident upon an object 87 under inspection by means of reflection mirrors 83b and 83c, illuminating lens group 85, reflection mirrors 83d and 83e and illuminating lens group 86.

The two linearly polarized light rays transmitted through the object 87 under inspection are then made incident upon a second portion of the polarized light separating and combining means 84 by means of objective lens group 88 and imaging lens group 89. These two linearly polarized light rays are combined thereby on the same optical axis and are made incident upon an analyzer 90 to form an interference image on an imaging plane 91.

In modifications of the embodiments shown in FIGS. 7 and 9, a back focal point of the illuminating optical system is changed in accordance with a focal length of an objective lens to be inserted into the optical axis such that the two linearly polarized light rays having mutually orthogonal vibrating directions are made incident upon the polarizing separating and combining means always in parallel with each other.

In another preferable modification, a phase difference between the two linearly polarized light rays with mutually orthogonal vibrating directions is changed by inserting a phase difference adjusting means in the optical path between the polarizer and the analyzer.

In another preferable modification, the illumination light source is formed by a quasi-monochromatic light source.

Figure 10:
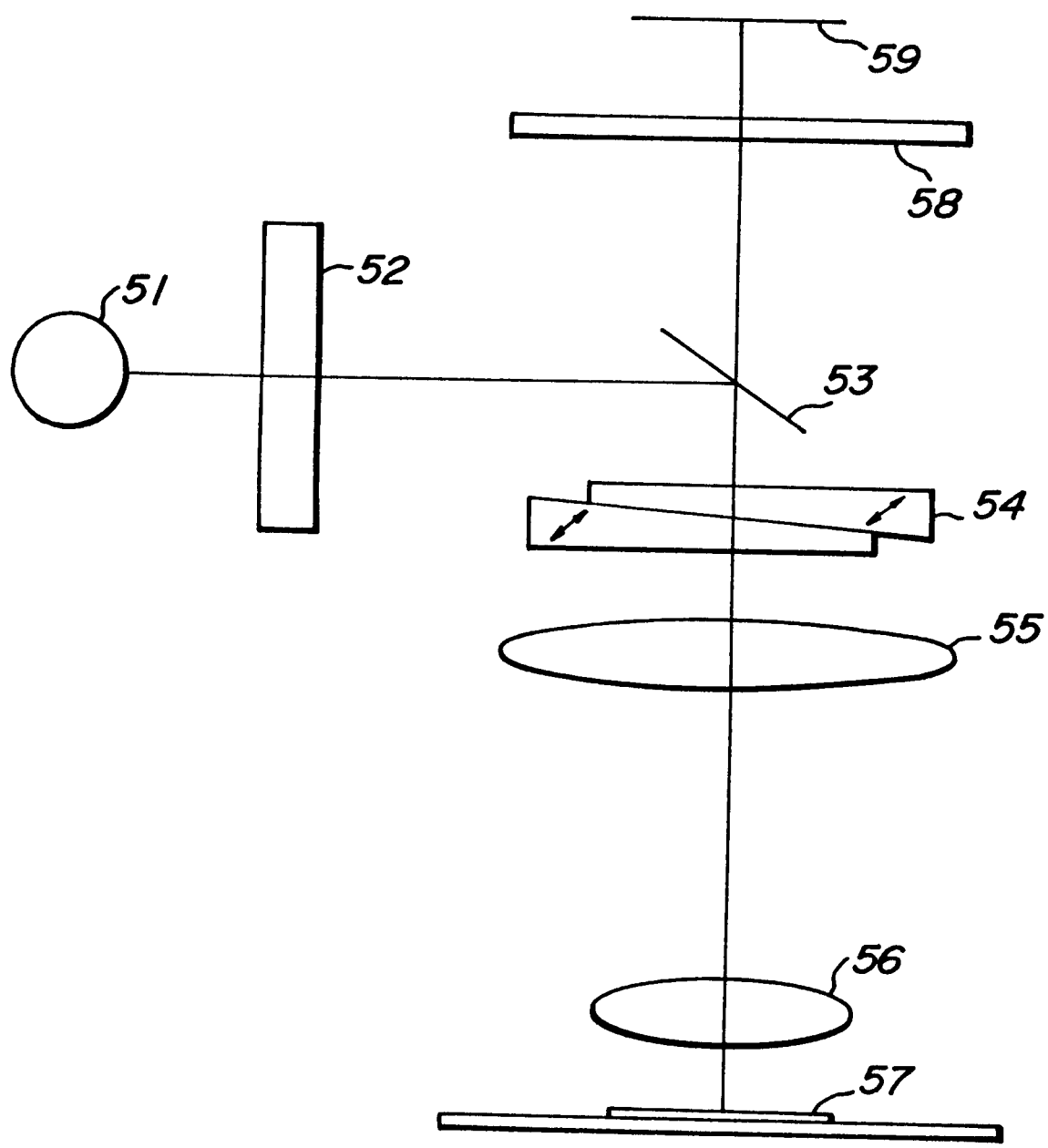
FIG. 10 is a schematic view showing an embodiment of the differential interference contrast microscope of reflection type according to the invention.

FIG. 10 is a schematic view showing a first embodiment of the differential interference contrast microscope of reflection type according to the invention. An illumination light ray emitted by an illuminating light source 51 is converted into a linearly polarized light ray by a polarizer 52. The linearly polarized light ray is reflected a half mirror 53 and then is made incident upon a polarized light separating and combining means 54. The linearly polarized light ray is separated into two polarized light rays having mutually orthogonal vibrating directions, which are then made incident upon an object 57 under inspection by means of imaging lens 55 and an objective lens 56. The polarized light separating and combining means 54 is arranged at such a position that the two linearly polarized light rays impinge upon the object 57 in parallel with each other.

The two linearly polarized light rays reflected by the object 57 under inspection are made incident upon the polarized light separating and combining means 54 by means of the objective lens 56 and imaging lens 55 and are combined thereby on the same optical axis. The thus combined two polarized light rays are made incident upon an analyzer 58 to form an interference image on an imaging plane 59.

In the differential interference contrast microscope of reflection type according to the present invention, it is possible to change an amount of wavefront shear by means of the simple construction using only one polarized light separating and combining means.

In a preferable embodiment of the differential interference contrast microscope of reflection type according to the invention, the inspecting optical system comprises a first lens group including the objective lens and a second lens group including the imaging lens, a back focal point of said first lens group is coincided with a front focal point of the second lens group, and the polarized light separating and combining means is arranged behind the second lens group.

That is to say, in this preferable embodiment, the construction shown in FIG. 4 is applied to the differential interference contrast microscope of reflection type. Then, the two linearly polarized light rays with mutually orthogonal vibrating directions emanating from the polarized light separating and combining means in parallel with each other and reflected by the object under inspection can be made incident upon the polarized light separating and combining means in parallel with each other and can be combined on the same optical axis.

In another preferable modification, a phase difference adjusting means is arranged in the optical path between the polarizer and the analyzer and a phase difference between the two linearly polarized light rays with mutually orthogonal vibrating directions is changed. in another preferable modification, the illumination light source is formed by a quasi-monochromatic light source. Then, the construction can be made simpler.

In another preferable modification, the polarized light separating and combining means is formed by two wedge-shaped crystal plates like as the polarized light separating and combining means 34 shown in FIG. 6. Then, an amount of wavefront shear between the two linearly polarized light rays can be adjusted by moving one of the crystal plates in the direction perpendicular to the optical axis.

Figure 11:
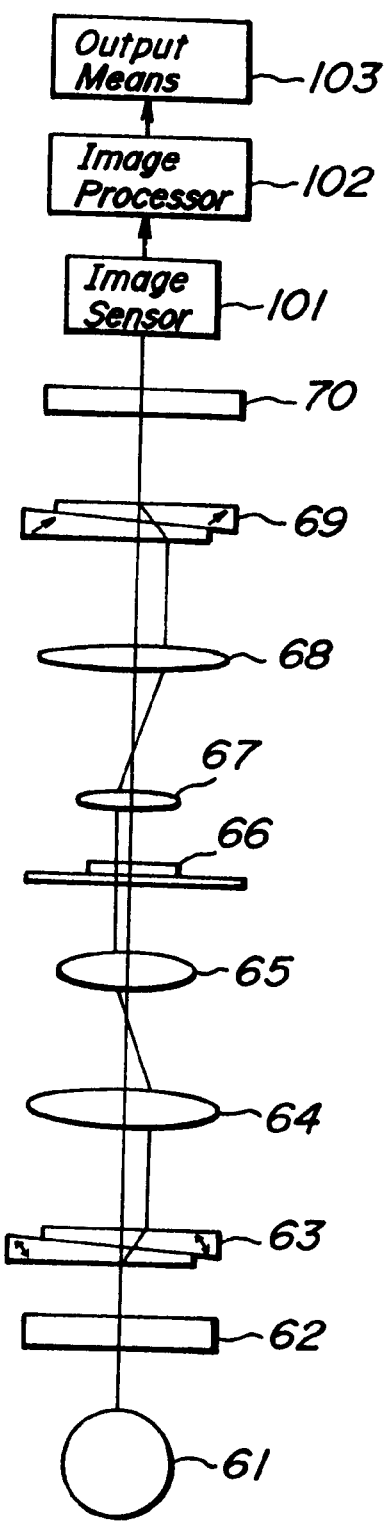
FIG. 11 is a schematic view representing a first embodiment of the microscopic image processing system according to the invention.

FIG. 11 is a schematic view showing a first embodiment of the microscopic image processing system according to the invention. In the present embodiment, use is made of the differential interference contrast microscope of transmission type illustrated in FIG. 3. The interference image formed on the imaging plane 70 is picked-up by an image sensing element 101 and an image signal from the image sensing element is supplied to an image processing means 102 to perform the contrast enhancement. Then the image signal having the enhanced contrast is supplied to an output means 103 such as a display monitor.

An amount of wavefront shear between the two linearly polarized light rays on the object 66 under inspection is adjusted by changing amounts of wavefront shear of the polarized light separating means 63 and polarized light combining means 69 in cooperation with each other. When the enhancement of contrast is not effected in the image processing means 102, an amount of wavefront shear is increased such that the contrast of the image inspected by naked eyes, and when the contrast enhancement is carried out in the image processing means, an amount of wavefront shear is decreased to increase the resolving power.

Figure 12:
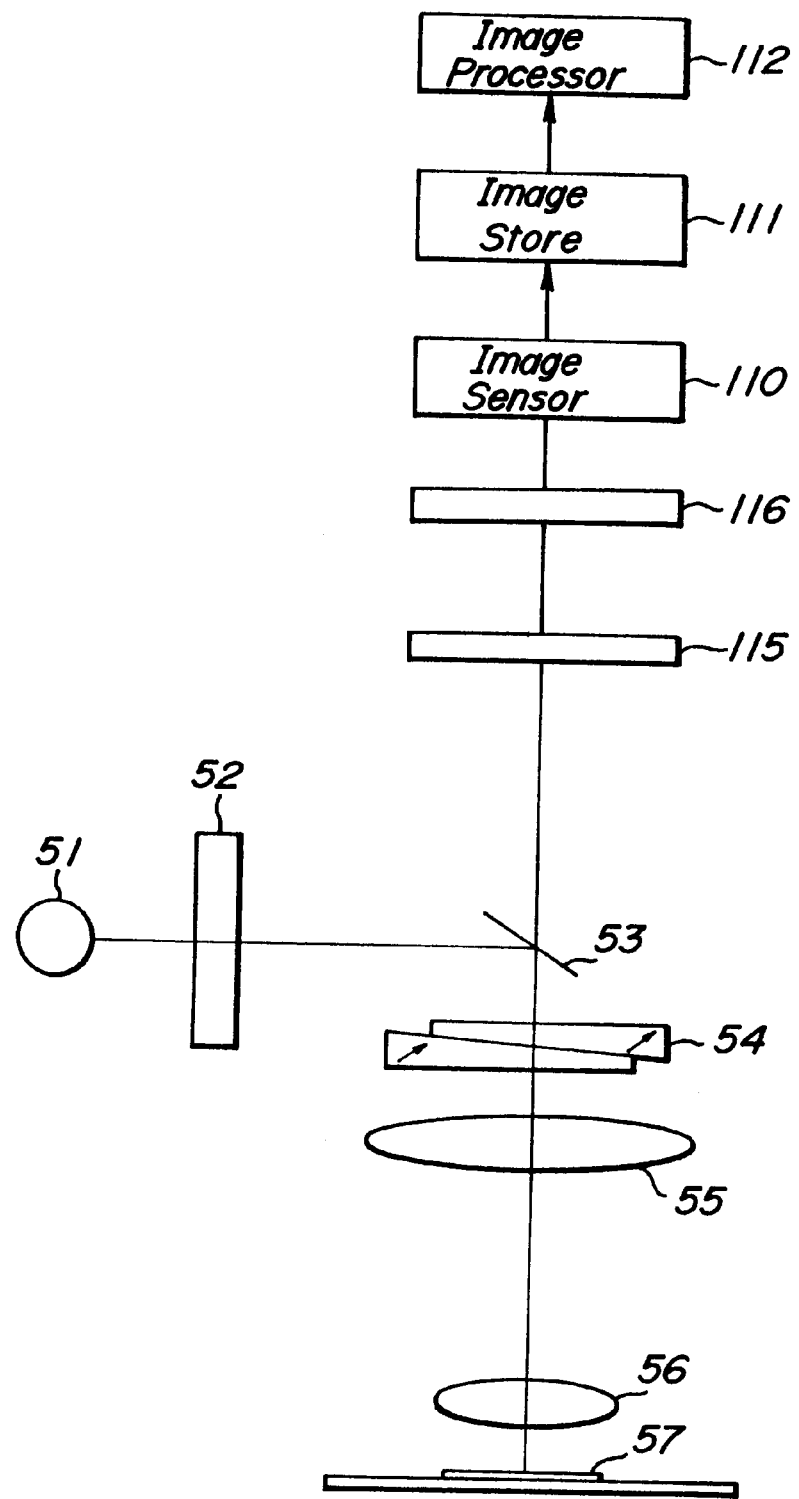
FIG. 12 is a schematic view showing a second embodiment of the microscopic image processing system according to the invention.

FIG. 12 is a schematic view illustrating a second embodiment of the microscopic image processing system according to the invention. In the present embodiment, the differential interference contrast microscope of reflection type shown in FIG. 10 is combined with a fringe scanning device for measuring a step structure. To this end, in the present embodiment, the analyzer 58 shown in FIG. 10 is replaced by a phase changing means of the fringe scanning device. Furthermore, an electronic image sensing element 110 is arranged at the imaging plane of the differential interference contrast microscope of reflection type to pick-up the interference image. An image signal from the image sensing element 110 is stored in an image storing means 111, and the stored image signal is processed in an image processing means 112 by the fringe scan method to measure a step in the object 57 under inspection.

The phase changing means is formed by ¼ wavelength plate 115 and a rotating analyzer 116 having a Sénarmont compensator. By rotating the analyzer 116, a phase difference between the two linearly polarized light rays with mutually orthogonal vibrating directions which are made incident upon the analyzer via the ¼ wavelength plate 115 can be changed. In the present microscopic image processing system of the present embodiment, an amount of wavefront shear can be changed by the polarized light separating and combining means 54 to a suitable value for measuring the step structure in the object 57 under inspection. Therefore, the measurement of the step structure can be performed with a high precision.

Figure 13:
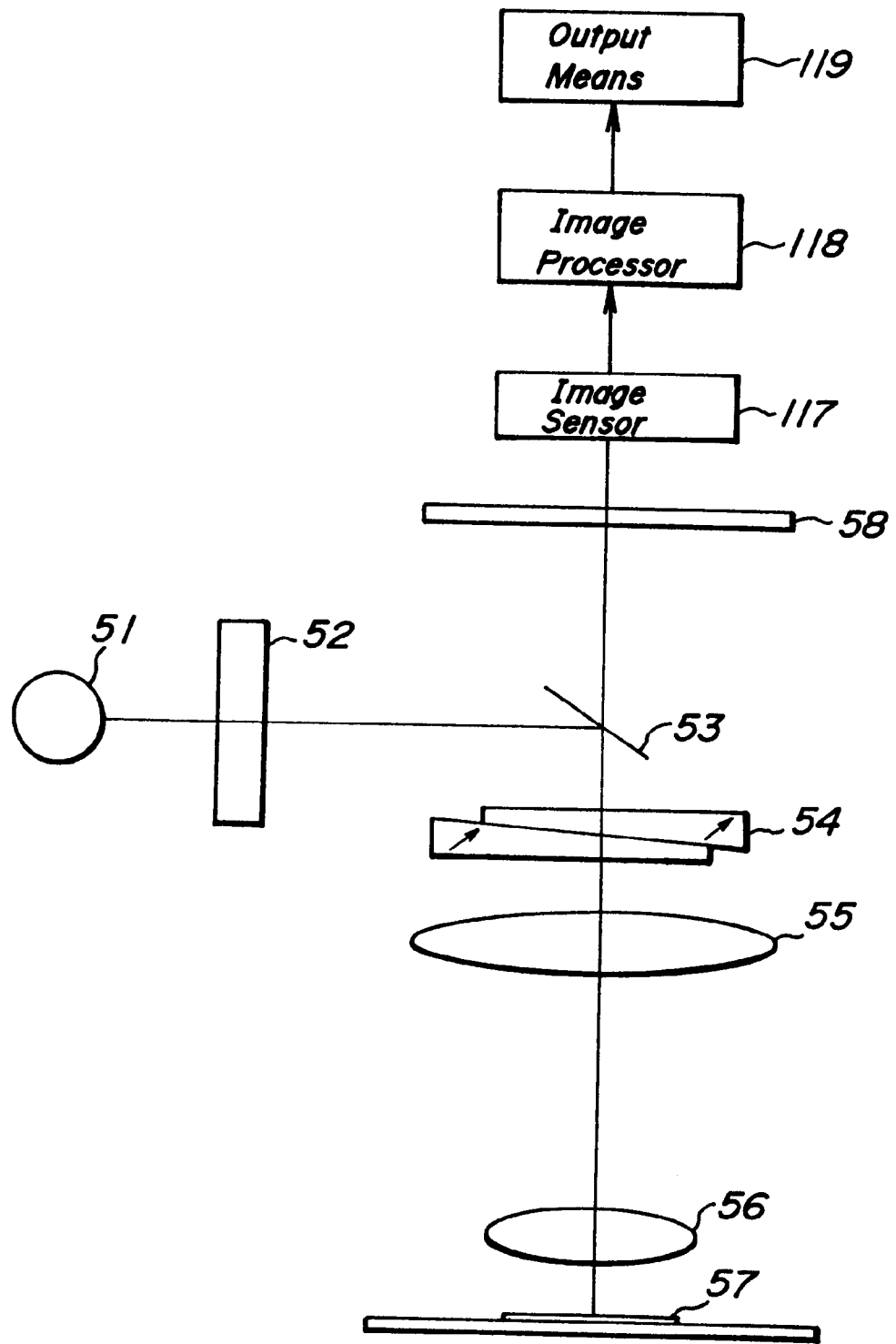
FIG. 13 is a schematic view depicting a third embodiment of the microscopic image processing system according to the invention.

FIG. 13 is a schematic view showing a third embodiment of the microscopic image processing system according to the invention. In the present embodiment, use is made of the differential interference contrast microscope of reflection type illustrated in FIG. 10 and a position of a pattern having protrusions and depressions on a surface of a semiconductor wafer is detected. The interference image formed on the imaging plane of the microscope is picked-up by an electronic image sensing element 117 and image signal derived from the image sensing element is supplied to an image processing means 118. In the image processing means 118, the image signal is processed to detect a position of the pattern of protrusions and depressions, and the thus detected position information is supplied to an output means 119. In the microscopic image processing system of the present embodiment, an amount of wavefront shear between the two linearly polarized light rays impinging upon the object 57 under inspection can be adjusted by the polarized separating and combining means 54 to an optimum value for detecting the pattern of protrusions and depressions with a high precision.

In preferable embodiments of the microscopic image processing system according to the invention, the differential interference contrast microscopes of reflection type shown in FIGS. 3, 7 and 9 can be advantageously used. Also in such preferable embodiments, an amount of wavefront shear between the two linearly polarized light rays with mutually orthogonal vibrating directions on the object under inspection can be adjusted to an optimum value, and thus it is possible to measure and detect the object with a high precision.

The present invention is not limited to the embodiments explained above, but many modifications and alternations can be conceived by those skilled in the art within the scope of the invention. For instance, in the above embodiments, the polarized light separating means, polarized combining means and polarized light separating and combining means are formed by a pair of wedge-shaped crystal plates, at least one of which is arranged movably in the direction perpendicular to the optical axis. According to the invention, as illustrated in FIG. 14, they may be formed by a pair of Savart's plates 121a and 121b, at least one of which is arranged movable in the direction perpendicular to the optical axis. Also in this case, an amount of wavefront shear between the two linearly polarized light rays with mutually orthogonal vibrating directions can be changed.

As stated above in detail, in the differential interference contrast microscope of transmission type and reflection type, an amount of wavefront shear can be adjusted by a simple construction and the differential interference contrast inspection can be performed with a very high precision.

Further, in the microscopic image processing system according to the invention, since an amount of wavefront shear can be adjusted to optimum values for both the inspection with naked eye and contrast enhancement, the measurement and detection can be carried out precisely.

What is claimed is:

1. A differential interference contrast microscope of transmission type comprising:
   an illumination light source means for emitting an illumination light ray;

a first polarizing means for converting the illumination light ray emitted from the illumination light source means into a linearly polarized light ray;

an illuminating optical system including a condenser lens and illuminating an object under inspection with said linearly polarized light ray;

an inspecting optical system including an objective lens and inspecting the object under inspection;

a second polarizing means for interfering two linearly polarized light rays combined on a same optical axis with each other to form an interference image;

a polarized light separating and combining means for separating the linearly polarized light ray emanating from the first polarizing means into two linearly polarized light rays having mutually orthogonal vibrating directions and combining two linearly polarized light rays propagating in parallel with each other on a same optical axis; and a reflection means for projecting said linearly polarized light ray emanating from said first polarizing means onto the object under inspection by means of said polarized light separating and combining means and illuminating optical system as said two linearly polarized light rays having mutually orthogonal vibrating directions and propagating in parallel with each other, and impinging the two linearly polarized light rays transmitted through the object under inspection, having mutually orthogonal vibrating directions and propagating in parallel with each other upon said polarized light separating and combining means by means of said inspecting optical system.

2. A microscope according to claim 1, wherein said linearly polarized light ray emanating from said first polarizing means is made incident upon a first portion of said polarized light separating and combining means and said two linearly polarized light rays having mutually orthogonal vibrating directions, propagating in parallel with each other and transmitted through the object under inspection is made incident upon a second portion of the polarized light separating and combining means, said second portion being different from said first portion.

3. A microscope according to claim 2, wherein said objective lens in the inspecting optical system is constructed to be removably inserted into the optical axis and said illuminating optical system is constructed to change a focal length of the illuminating optical system in accordance with a back focal point of an objective lens to be inserted into the optical axis.

4. A microscope according to claim 1, wherein said objective lens in the inspecting optical system is constructed to be removably inserted into the optical axis and said illuminating optical system is constructed to change a focal length of the illuminating optical system in accordance with a back focal point of an objective lens to be inserted into the optical axis.

* * * * *